US012644696B2

(12) United States Patent
Zach et al.

(10) Patent No.: US 12,644,696 B2
(45) Date of Patent: Jun. 2, 2026

(54) SYSTEM AND METHOD FOR DETECTING PARTICLE CONTAMINATION ON A BONDING TOOL

(71) Applicant: KLA Corporation, Milpitas, CA (US)

(72) Inventors: Franz Zach, Los Gatos, CA (US); Mark D. Smith, San Jose, CA (US); Roel Gronheid, Leuven (BE)

(73) Assignee: KLA Corporation, Milpitas, CA (US)

( * ) Notice: Subject to any disclaimer, the term of this patent is extended or adjusted under 35 U.S.C. 154(b) by 684 days.

(21) Appl. No.: 17/589,704

(22) Filed: Jan. 31, 2022

(65) Prior Publication Data

US 2023/0032406 A1     Feb. 2, 2023

Related U.S. Application Data

(60) Provisional application No. 63/226,642, filed on Jul. 28, 2021.

(51) Int. Cl.
*G01B 11/24*          (2006.01)
*G01B 9/02*           (2022.01)
(Continued)

(52) U.S. Cl.
CPC ............ *G01B 11/2441* (2013.01); *G01B 9/02* (2013.01); *G01N 21/94* (2013.01); *G01N 21/9501* (2013.01); *G01N 21/956* (2013.01)

(58) Field of Classification Search
CPC ...... G01B 11/2441; G01B 9/02; G01N 21/94; G01N 21/9501; G01N 21/956
See application file for complete search history.

(56) References Cited

U.S. PATENT DOCUMENTS

| | | | |
|---|---|---|---|
| 5,202,748 A | 4/1993 | MacDonald et al. |
| 6,064,486 A | 5/2000 | Chen et al. |

(Continued)

FOREIGN PATENT DOCUMENTS

| | | |
|---|---|---|
| CA | 2334388 A1 | 10/2000 |
| CN | 100552908 C | 10/2009 |

(Continued)

OTHER PUBLICATIONS

Sakanas, Aurimas, et al. "Comparison of processing-induced deformations of InP bonded to Si determined by e-beam metrology: Direct vs. adhesive bonding." Microelectronic Engineering 214 (2019): 93-99. (Year: 2019).*

(Continued)

*Primary Examiner* — Dominic J Bologna
(74) *Attorney, Agent, or Firm* — Suiter Swantz IP

(57)          ABSTRACT

A wafer shape metrology system includes a wafer shape metrology sub-system configured to perform one or more stress-free shape measurements on a bonded pair of wafers, where the bonded pair of wafers are bonded with a bonding tool. The wafer shape metrology sub-system includes a controller communicatively coupled to the wafer shape metrology sub-system. The controller is configured to receive stress-free shape measurements from the wafer shape sub-system; convert the stress-free shape measurements into an overlay distortion pattern; detect one or more localized deviations in the bonded pair of wafers in order to identify one or more contaminant particles on the bonding tool; and report the one or more localized deviations in the bonded pair of wafers.

19 Claims, 4 Drawing Sheets

<u>100</u>

(51) Int. Cl.
   *G01N 21/94*        (2006.01)
   *G01N 21/95*        (2006.01)
   *G01N 21/956*       (2006.01)

(56)                References Cited

U.S. PATENT DOCUMENTS

| | | | |
|---|---|---|---|
| 6,238,939 | B1 | 5/2001 | Wachs et al. |
| 6,335,791 | B1 | 1/2002 | Miyatake |
| 6,600,565 | B1 | 7/2003 | Suresh et al. |
| 6,762,846 | B1 | 7/2004 | Poris |
| 6,847,458 | B2 | 1/2005 | Freischlad et al. |
| 7,056,751 | B2 | 6/2006 | Faris |
| 7,079,257 | B1 | 7/2006 | Kirkpatrick et al. |
| 7,433,051 | B2 | 10/2008 | Owen |
| 7,570,796 | B2 | 8/2009 | Zafar et al. |
| 7,676,077 | B2 | 3/2010 | Kulkarni et al. |
| 7,875,528 | B2 | 1/2011 | La Tulipe, Jr. et al. |
| 8,163,570 | B2 | 4/2012 | Castex et al. |
| 8,394,719 | B2 | 3/2013 | Tsen et al. |
| 8,475,612 | B2 | 7/2013 | Gaudin |
| 8,575,002 | B2 | 11/2013 | Broekaart et al. |
| 8,640,548 | B2 * | 2/2014 | Wimplinger ...... H01L 21/67259 |
| | | | 73/760 |
| 8,703,368 | B2 | 4/2014 | Lee et al. |
| 8,768,665 | B2 | 7/2014 | Veeraraghavan et al. |
| 8,769,453 | B2 | 7/2014 | Scheffer et al. |
| 8,859,335 | B2 | 10/2014 | Lee et al. |
| 8,892,237 | B2 | 11/2014 | Vaid et al. |
| 8,900,885 | B1 | 12/2014 | Hubbard et al. |
| 8,949,057 | B1 | 2/2015 | Seong et al. |
| 9,087,176 | B1 | 7/2015 | Chang et al. |
| 9,116,442 | B2 | 8/2015 | Adel et al. |
| 9,121,684 | B2 | 9/2015 | Tang et al. |
| 9,312,161 | B2 | 4/2016 | Wimplinger et al. |
| 9,354,526 | B2 | 5/2016 | Vukkadala et al. |
| 9,466,538 | B1 | 10/2016 | Skordas et al. |
| 9,733,075 | B2 | 8/2017 | Broekaart et al. |
| 9,779,202 | B2 | 10/2017 | Vukkadala et al. |
| 9,852,972 | B2 | 12/2017 | Seddon et al. |
| 9,915,625 | B2 | 3/2018 | Gao et al. |
| 9,935,022 | B2 | 4/2018 | Owen |
| 10,024,654 | B2 | 7/2018 | Smith et al. |
| 10,234,772 | B2 | 3/2019 | Bangar et al. |
| 10,249,523 | B2 | 4/2019 | Vukkadala et al. |
| 10,267,746 | B2 | 4/2019 | Duffy et al. |
| 10,325,798 | B2 | 6/2019 | Wimplinger et al. |
| 10,401,279 | B2 | 9/2019 | Vukkadala et al. |
| 10,622,233 | B2 | 4/2020 | Hooge et al. |
| 10,649,447 | B2 | 5/2020 | Izikson et al. |
| 10,788,759 | B2 | 9/2020 | Tsai et al. |
| 10,886,256 | B2 | 1/2021 | Guo |
| 11,289,422 | B2 | 3/2022 | Yan et al. |
| 11,335,607 | B2 | 5/2022 | Ip |
| 11,393,118 | B2 | 7/2022 | Agarwal et al. |
| 11,710,649 | B2 | 7/2023 | Mizuta |
| 11,768,441 | B2 | 9/2023 | Berge et al. |
| 11,782,411 | B2 | 10/2023 | Zach et al. |
| 11,829,077 | B2 | 11/2023 | Zach et al. |
| 12,164,277 | B2 | 12/2024 | Zach et al. |
| 12,197,137 | B2 * | 1/2025 | Zach ................. G01N 21/9501 |
| 2002/0071112 | A1 | 6/2002 | Smith et al. |
| 2002/0105649 | A1 | 8/2002 | Smith et al. |
| 2004/0023466 | A1 | 2/2004 | Yamauchi |
| 2004/0075825 | A1 | 4/2004 | Suresh et al. |
| 2005/0066739 | A1 | 3/2005 | Gotkis et al. |
| 2005/0087578 | A1 | 4/2005 | Jackson |
| 2005/0147902 | A1 | 7/2005 | Schaar et al. |
| 2005/0254030 | A1 | 11/2005 | Tolsma et al. |
| 2005/0271955 | A1 | 12/2005 | Cherala et al. |
| 2006/0141743 | A1 | 6/2006 | Best et al. |
| 2006/0170934 | A1 | 8/2006 | Picciotto et al. |
| 2006/0216025 | A1 | 9/2006 | Kihara et al. |
| 2007/0037318 | A1 | 2/2007 | Kim |
| 2007/0064243 | A1 | 3/2007 | Yunus et al. |
| 2007/0212856 | A1 | 9/2007 | Owen |

| | | | |
|---|---|---|---|
| 2007/0242271 | A1 | 10/2007 | Moon |
| 2008/0030701 | A1 | 2/2008 | Lof |
| 2008/0057418 | A1 | 3/2008 | Seltmann et al. |
| 2008/0106714 | A1 | 5/2008 | Okita |
| 2008/0182344 | A1 | 7/2008 | Mueller et al. |
| 2008/0188036 | A1 | 8/2008 | Tulipe et al. |
| 2008/0199978 | A1 | 8/2008 | Fu et al. |
| 2008/0316442 | A1 | 12/2008 | Adel et al. |
| 2010/0102470 | A1 | 4/2010 | Mokaberi |
| 2011/0172982 | A1 | 7/2011 | Veeraraghavan et al. |
| 2011/0210104 | A1 | 9/2011 | Wahlsten et al. |
| 2011/0265578 | A1 | 11/2011 | Johnson et al. |
| 2012/0006463 | A1 | 1/2012 | Gaudin |
| 2012/0255365 | A1 * | 10/2012 | Wimplinger ...... H01L 21/67092 |
| | | | 73/760 |
| 2012/0257207 | A1 * | 10/2012 | Marx ................... G01B 11/306 |
| | | | 356/451 |
| 2013/0054154 | A1 | 2/2013 | Broekaart et al. |
| 2013/0286395 | A1 | 10/2013 | Lee et al. |
| 2014/0057450 | A1 | 2/2014 | Bourbina et al. |
| 2014/0102221 | A1 | 4/2014 | Rebhan et al. |
| 2014/0209230 | A1 | 7/2014 | Wagenleitner |
| 2015/0044786 | A1 | 2/2015 | Huang et al. |
| 2015/0120216 | A1 | 4/2015 | Vukkadala et al. |
| 2015/0279709 | A1 | 10/2015 | La Tulipe et al. |
| 2016/0005662 | A1 * | 1/2016 | Yieh ........................ H01L 22/20 |
| | | | 438/14 |
| 2016/0172254 | A1 * | 6/2016 | Wimplinger ............. G01B 7/06 |
| | | | 356/630 |
| 2017/0162456 | A1 | 6/2017 | Owen |
| 2017/0221856 | A1 | 8/2017 | Yamauchi |
| 2017/0243853 | A1 | 8/2017 | Huang et al. |
| 2018/0165404 | A1 * | 6/2018 | Eyring .................. G06F 30/398 |
| 2018/0342410 | A1 | 11/2018 | Hooge et al. |
| 2019/0122915 | A1 | 4/2019 | Mitsuishi et al. |
| 2019/0148184 | A1 | 5/2019 | Sugaya et al. |
| 2019/0206711 | A1 | 7/2019 | Wimplinger et al. |
| 2019/0257647 | A1 | 8/2019 | Ichinose et al. |
| 2019/0271542 | A1 | 9/2019 | Shchegrov et al. |
| 2019/0287854 | A1 | 9/2019 | Miller et al. |
| 2019/0353582 | A1 | 11/2019 | Vukkadala et al. |
| 2020/0018709 | A1 | 1/2020 | Hosler et al. |
| 2020/0091015 | A1 | 3/2020 | Sugaya et al. |
| 2020/0328060 | A1 | 10/2020 | Iizuka |
| 2021/0296147 | A1 | 9/2021 | Mizuta |
| 2022/0034823 | A1 * | 2/2022 | Ono ................... G01N 21/9501 |
| 2022/0187718 | A1 | 6/2022 | Zach et al. |
| 2022/0230099 | A1 | 7/2022 | Pandith et al. |
| 2022/0344282 | A1 | 10/2022 | Subrahmanyan et al. |
| 2023/0030116 | A1 * | 2/2023 | Zach ................. H01L 21/67121 |
| 2023/0032406 | A1 | 2/2023 | Zach et al. |
| 2023/0035201 | A1 * | 2/2023 | Zach ................. H01L 21/67121 |
| 2024/0094642 | A1 * | 3/2024 | Zach ................. G01N 21/9501 |

FOREIGN PATENT DOCUMENTS

| | | |
|---|---|---|
| CN | 100562784 C | 11/2009 |
| CN | 101727011 A | 6/2010 |
| CN | 103378067 A | 10/2013 |
| CN | 102656678 B | 4/2015 |
| CN | 104977816 A | 10/2015 |
| CN | 103283000 B | 10/2016 |
| CN | 106547171 A | 3/2017 |
| CN | 104658950 B | 1/2018 |
| CN | 109451761 A | 3/2019 |
| CN | 106887399 B | 2/2020 |
| CN | 109891563 B | 2/2021 |
| CN | 114361014 A | 4/2022 |
| EP | 1829130 A1 | 9/2007 |
| EP | 2299472 A1 | 3/2011 |
| EP | 2463892 A1 | 6/2012 |
| EP | 2463892 B1 | 4/2013 |
| EP | 2656378 B1 | 3/2015 |
| EP | 2863421 A1 | 4/2015 |
| EP | 1829130 B1 | 7/2016 |
| EP | 2854157 B1 | 1/2019 |
| EP | 3460833 A1 | 3/2019 |
| GB | 2462734 B | 5/2010 |

(56)                    References Cited

FOREIGN PATENT DOCUMENTS

| | | |
|---|---|---|
| JP | H11135413 A | 5/1999 |
| JP | H11176749 A | 7/1999 |
| JP | 2001068429 A | 3/2001 |
| JP | 2001077012 A | 3/2001 |
| JP | 2002118052 A | 4/2002 |
| JP | 2002229044 | 9/2005 |
| JP | 2005233928 A | 9/2005 |
| JP | 2005251972 A | 9/2005 |
| JP | 2006186377 A | 7/2006 |
| JP | 2007158200 A | 6/2007 |
| JP | 2007173526 A | 7/2007 |
| JP | 2009113312 A | 5/2009 |
| JP | 2009529785 A | 8/2009 |
| JP | 2009239095 A | 10/2009 |
| JP | 2009294001 B | 12/2009 |
| JP | 2010529659 A | 8/2010 |
| JP | 2010272707 A | 12/2010 |
| JP | 5611371 B2 | 10/2014 |
| JP | 6279324 B2 | 2/2018 |
| JP | 2018036317 A | 3/2018 |
| JP | 2020021076 A | 2/2020 |
| JP | 2022098312 A | 7/2022 |
| KR | 20040014686 A | 2/2004 |
| KR | 20040046696 A | 6/2004 |
| KR | 100914446 B1 | 8/2009 |
| KR | 20090099871 A | 9/2009 |
| KR | 101313909 B1 | 10/2013 |
| KR | 20140069352 A | 6/2014 |
| KR | 101801409 B1 | 12/2017 |
| KR | 101849443 B1 | 4/2018 |
| KR | 101866622 B1 | 6/2018 |
| KR | 101866719 B1 | 6/2018 |
| KR | 20180065033 A | 6/2018 |
| KR | 102161093 B1 | 9/2020 |
| SG | 181435 A1 | 7/2012 |
| SG | 187694 A1 | 3/2013 |
| TW | 200421422 A | 10/2004 |
| TW | 201322353 A | 6/2013 |
| TW | I447842 B | 8/2014 |
| TW | 201532165 A | 8/2015 |
| TW | 201630217 A | 8/2016 |
| TW | I563548 B | 12/2016 |
| TW | I563549 B | 12/2016 |
| TW | I618130 B | 3/2018 |
| TW | 201946099 A | 12/2019 |
| TW | I680506 B | 12/2019 |
| TW | 202127649 A | 7/2021 |
| WO | 2005067046 A1 | 7/2005 |
| WO | 2009113312 A1 | 9/2009 |
| WO | 2012079786 A1 | 6/2012 |
| WO | 2012083978 A1 | 6/2012 |
| WO | 2012126752 A1 | 9/2012 |
| WO | 2012135513 A1 | 10/2012 |
| WO | 2013158039 A3 | 6/2016 |
| WO | 2017217431 A1 | 12/2017 |
| WO | 2018012300 A1 | 1/2018 |
| WO | 2018071716 A1 | 4/2018 |
| WO | 2019146427 A1 | 8/2019 |
| WO | 2020045158 A1 | 3/2020 |
| WO | 2020226152 A1 | 11/2020 |
| WO | 2021106527 A1 | 6/2021 |
| WO | 2022125343 A1 | 6/2022 |

OTHER PUBLICATIONS

U.S. Appl. No. 17/589,516, filed Jan. 31, 2022, Franz Zach.
U.S. Appl. No. 17/589,630, filed Jan. 31, 2022, Franz Zach.
Chan, et al. "An approach for alignment, mounting, and integration of IXO mirror segments." Optical Engineering + Applications (2009).
Cotte, et al., "Film stress changes during anodic bonding of NGL masks," Proc. SPIE 3997, Emerging Lithographic Technologies IV, (Jul. 21, 2000); https://doi.org/10.1117/12.390089.

Feng, et al., (Jan. 14, 2007). "On the Stoney Formula for a Thin Film/Substrate System With Nonuniform Substrate Thickness." ASME. J. Appl. Mech. Nov. 2007; 74(6): 1276-1281. https://doi.org/10.1115/1.2745392.
Goyal, et al., "Solder bonding for microelectromechanical systems (MEMS) applications," Proc. SPIE 4980, Reliability, Testing, and Characterization of MEMS/MOEMS II, (Jan. 16, 2003); https://doi.org/10.1117/12.478202.
Nagaswami, et al., "DPL Overlay Components," 6th International Symp. on Immersion Lithography Extensions, Prague, Nov. 2009.
Nagaswami, et al., (2010). Overlay error components in double-patterning lithography. Solid State Technology. 53. 26-28.
Tippur, Hareesh V.. "Simultaneous and real-time measurement of slope and curvature fringes in thin structures using shearing interferometery." Optical Engineering 43 (2004): 3014-3020.
Turner, et al., (2004). Mechanics of wafer bonding: Effect of clamping. Journal of Applied Physics. 95. 10.1063/1.1629776.
Turner, et al., "Mechanics of direct wafer bonding." Proceedings of the Royal Society A: Mathematical, Physical and Engineering Sciences 462 (2005): 171-188.
U.S. Appl. No. 17/161,369, filed Jan. 28, 2021, Zach et al.
U.S. Appl. No. 17/563,477, filed Jan. 28, 2021, Zach et al.
Aitken et al., (2006). Discussion of tooling solutions for the direct bonding of silicon wafers. Microsystem Technologies. 12. 413-417. 10.1007/s00542-005-0028-4.
Aitken et al., "Glass-Glass Wafer Bonding for Microfluidic Devices." Proceedings of the 2008 Second International Conference on Integration and Commercialization of Micro and Nanosystems. 2008 Second International Conference on Integration and Commercialization of Micro and Nanosystems. Clear Water Bay, Kowloon, Hong Kong. Jun. 3-5, 2008. pp. 529-533. ASME. https://doi.org/10.1115/MicroNano2008-70293.
Asundi et al., "Rapid Defect Detections of Bonded Wafer Using Near Infrared Polariscope", Nanyang Technological University Singapore2011, Retrieved From http://dr.ntu.edu.sg.
Burns J. et al. (2008) An SOI-Based 3D Circuit Integration Technology. In: Tan C., Gutmann R., Reif L. (eds) Wafer Level 3-D ICs Process Technology. Integrated Circuits and Systems. Springer, Boston, MA. https://doi.org/10.1007/978-0-387-76534-1_8.
Burns, J.A., et al., "A wafer-scale 3-D circuit integration technology," in IEEE Transactions on Electron Devices, vol. 53, No. 10, pp. 2507-2516, Oct. 2006, doi: 10.1109/TED.2006.882043.
Byelyayev, Anton, "Stress diagnostics and crack detection in full-size silicon wafers using resonance ultrasonic vibrations" (2005). Graduate Theses and Dissertations.http://scholarcommons.usf.edu/etd/2969.
Chen, Kuan-Neng (2005). Copper Wafer Bonding in Three-Dimensional Integration [Unpublished Doctoral thesis] Massachusetts Institute of Technology.
Choi et al., (2005). Distortion and overlay performance of UV step and repeat imprint lithography. Microelectronic Engineering. 78-79. 633-640. 10.1016/j.mee.2004.12.097.
De Wolf, "Raman Spectroscopy: About Chips and Stress", Ramanspectoscopy, IMEC, Kapeldreef 75, B-3001 Leuven, Belgium 2003.
Di Cioccio, L. et al., "Direct bonding for wafer level 3D integration," 2010 IEEE International Conference on Integrated Circuit Design and Technology, 2010, pp. 110-113, doi: 10.1109/ICICDT.2010.5510276.
Garnier, A. et al., "Results on aligned SiO2/SiO2 direct wafer-to-wafer low temperature bonding for 3D integration," 2009 IEEE International SOI Conference, 2009, pp. 1-2, doi: 10.1109/SOI.2009.5318753.
Gegenwarth et al., "Effect of Plastic Deformation of Silicon Wafers on Overlay", Proc. SPIE 0100, Developments in Semiconductor Microlithography II, (Aug. 8, 1977); https://doi.org/10.1117/12.955355.
Hanna et al., (1999). Numerical and experimental study of the evolution of stresses in flip chip assemblies during assembly and thermal cycling. 1001-1009. 10.1109/ECTC.1999.776308.

(56) References Cited

OTHER PUBLICATIONS

Horn et al., (2008). Detection and Quantification of Surface Nanotopography-Induced Residual Stress Fields in Wafer-Bonded Silicon. Journal of The Electrochemical Society. 155. H36-H42. 10.1149/1.2799880.

Huston, et al., (2004). Active membrane masks for improved overlay performance in proximity lithography. Proc SPIE. 5388. 11-19. 10.1117/12.546598.

Lim, et al., "Warpage Modeling and Characterization to Simulate the Fabrication Process of Wafer-Level Adhesive Bonding," 2007 32nd IEEE/CPMT International Electronic Manufacturing Technology Symposium, 2007, pp. 298-302, doi: 10.1109/IEMT.2007. 4417081.

Liu et al., Application of IVS Overlay Measurement to Wager Deformation Characterization Study (2004).

Meinhold et al., "Sensitive strain measurements of bonded SOI films using Moire/spl acute/," in IEEE Transactions on Semiconductor Manufacturing, vol. 17, No. 1, pp. 35-41, Feb. 2004, doi: 10.1109/TSM.2003.823259.

Nagarajan, R. (2009). Commercialization of low temperature copper thermocompression bonding for 3D integrated circuits. [unpublished Masters thesis] Massachusetts Institute of Technology.

Nagaswami et al., Overlay error components in double-patterning lithography, retrieved from Internet Sep. 2010.

Nagaswami, et al., "Double Patterning Lithography Overlay Components," 6th International Symp. on Immersion Lithography Extensions, Prague, Nov. 2009.

Raghunathan et al., "Correlation of overlay performance and reticle substrate non-flatness effects in EUV lithography", Proc. SPIE 7488, Photomask Technology 2009, 748816 (Sep. 30, 2009); https://doi.org/10.1117/12.834746.

Rudack et al., "IR microscopy as an early electrical yield indicator in bonded wafer pairs used for 3D integration," Proc. SPIE 7638, Metrology, Inspection, and Process Control for Microlithography XXIV, 763815 (Apr. 1, 2010); https://doi.org/10.1117/12.848400.

Schaper, et al., "Induced thermal stress fields for three-dimensional distortion control of Si wafer topography", <i>Review of Scientific Instruments</i>, vol. 75, No. 6, pp. 1997-2002, 2004. doi:10.1063/1.1753101.

Shetty, et al., "Impact of laser spike annealing dwell time on wafer stress and photolithography overlay errors," 2009 International Workshop on Junction Technology, 2009, pp. 119-122, doi:10.1109/IWJT.2009.5166234.

Steen et al., (2007). Overlay as the key to drive wafer scale 3D integration. Microelectronic Engineering. 84. 1412-1415. 10.1016/j.mee.2007.01.231.

Tanaka, Tetsu et al., "3D LSI technology and reliability issues", Digest of Technical Papers—Symposium on VLSI Technology (2011).

Tupek, Michael et al., "Submicron aligned wafer bonding via capillary forces." Journal of Vacuum Science & Technology B 25 (2007): 1976-1981.

Turner et al., "Predicting distortions and overlay errors due to wafer deformation during chucking on lithography scanners," J. Micro/Nanolith. MEMS MOEMS 8(4) 043015 (Oct. 1, 2009) https://doi.org/10.1117/1.3247857.

Turner, K. T.et al., "Modeling of direct wafer bonding: Effect of wafer bow and etch patterns", Journal of Applied Physics, vol. 92, No. 12, pp. 7658-7666, 2002. doi:10.1063/1.1521792.

Y Gogotsi et al., "Raman Microspectroscopy Study of Processing-Induced Phase Transformations and Residual Stress in Silicon", Semiconductor Science and Technology, vol. 14, No. 10, Department of Mechanical Engineering, University of Illinois at Chicago, Chicago, IL, Mar. 4, 1999.

Korean Intellectual Property Office, International Search Report and Written Opinion for International Application No. PCT/US2023/032022, Dec. 28, 2023, 9 pages.

Aitken, et al. "Discussion of tooling solutions for the direct bonding of silicon wafers." Microsystem Technologies 12 (2006): 413-417.

Burns et al., "A wafer-scale 3-D circuit integration technology," in IEEE Transactions on Electron Devices, vol. 53, No. 10, pp. 2507-2516, Oct. 2006, doi: 10.1109/TED.2006.882043.

Burns, et al. "An SOI-based three-dimensional integrated circuit technology." 2000 IEEE International SOI Conference. Proceedings (Cat. No. 00CH37125) (2000): 20-21.

Chen, Kuan-Neng (2005). Copper Wafer Bonding in Three-Dimensional Integration [Published Doctoral thesis] Massachusetts Institute of Technology.

Choi, et al., Distortion and overlay performance of UV step and repeat imprint lithography, Microelectronic Engineering, vols. 78-79, 2005, pp. 633-640, ISSN 0167-9317, https://doi.org/10.1016/j.mee.2004.12.097.

Di Cioccio, et al., "Direct bonding for wafer level 3D integration," 2010 IEEE International Conference on Integrated Circuit Design and Technology, 2010, pp. 110-113, doi: 10.1109/ICICDT.2010.5510276.

Garnier, et al., "Results on aligned SiO2/SiO2 direct wafer-to-wafer low temperature bonding for 3D integration," 2009 IEEE International SOI Conference, 2009, pp. 1-2, doi: 10.1109/SOI.2009.5318753.

Hanna, et al., "Numerical and experimental study of the evolution of stresses in flip chip assemblies during assembly and thermal cycling," 1999 Proceedings. 49th Electronic Components and Technology Conference (Cat. No. 99CH36299), 1999, pp. 1001-1009, doi: 10.1109/ECTC.1999.776308.

International Search Report and Written Opinion in Application No. PCT/US2021/061310 dated Mar. 28, 2022, 8 pages.

Liu, et al., "Application of IVS Overlay Measurement to Wafer Deformation Characterization Study." (2004).

Meinhold, et al., (2004). Sensitive Strain Measurements of Bonded SOI Films Using Moiré. Semiconductor Manufacturing, IEEE Transactions on. 17. 35-41. 10.1109/TSM.2003.823259.

Nagarajan, R. (2008). Commercialization of low temperature copper thermocompression bonding for 3D integrated circuits. [Published Masters thesis] Massachusetts Institute of Technology.

Raghunathan, et al., (2009). Correlation of overlay performance and reticle substrate non-flatness effects in EUV lithography. Proc SPIE. 7488. 10.1117/12.834746.

Rudack, et al., (2010). IR microscopy as an early electrical yield indicator in bonded wafer pairs used for 3D integration. 10.1117/12.848400.

Search Report and Written Opinion in International Application No. PCT/US2022/037522 dated Nov. 9, 2022. 9 pages.

Search Report and Written Opinion in International Application No. PCT/US2022/038412 dated Nov. 16, 2022, 8 pages.

Steen, et al. "Overlay as the key to drive wafer scale 3D integration." Microelectronic Engineering 84 (2007): 1412-1415.

Tupek, et al., "Submicron aligned wafer bonding via capillary forces." Journal of Vacuum Science & Technology B 25 (2007): 1976-1981.

Turner, et al., (2002). Modeling of direct wafer bonding: Effect of wafer bow and etch patterns. Journal of Applied Physics. 92. 7658-7666. 10.1063/1.1521792.

Turner, Kevin T. et al. "Predicting distortions and overlay errors due to wafer deformation during chucking on lithography scanners." Journal of Micro-nanolithography Mems and Moems 8 (2009): 043015.

Turner, Kevin T., "Wafer-Bonding: Mechanics-Based Models and Experiments", Massachusetts Institute of Technology, May 2004, Thesis, 186 pages.

Search Report and Written Opinion in International Application No. PCT/US2022/036745 dated Nov. 9, 2022, 8 pages.

European Patent Office, Extended European Search Report received in EP Application No. 22850076.5, Feb. 20, 2025, 11 pages.

European Patent Office, Extended European Search Report received in EP Application No. 22850101.1, Mar. 5, 2025, 14 pages.

European Patent Office, Extended European Search Report received in EP Application No. 22850212.6, Jul. 2, 2025, 10 pages.

Sakanas et al., "Comparison of processing-induced deformations of InP bonded to Si determined by e-beam metrology: direct vs. adhesion bonding," Dec. 4, 2018, 7 pages.

(56) References Cited

OTHER PUBLICATIONS

Steen et al., "Overlay as the key to drive wafer scale 3D integration," Microelectronic Engineering, vol. 84, May 2007, 4 pages.
Taiwan Patent Office, Office Action received in TW Application No. 111121141, Nov. 25, 2024, 11 pages.
European Patent Office, Extended European Search Report received in EP Application No. 21904130.8, Sep. 17, 2024, 11 pages.
Japanese Patent Office, Office Action received in JP Application No. 2023-533686, Dec. 19, 2024, 15 pages (including translation).
Taiwan Patent Office, Office Action received in TW Application No. 110126925, Oct. 25, 2024, 8 pages (including translation).
Taiwan Patent Office, Office Action received in TW Application No. 111121774, Jul. 30, 2025, 18 pages (including translation).
Taiwan Patent Office, Taiwan Office Action for Application No. TW111128372 dated Jan. 5, 2026, 20 pages (with translation).

* cited by examiner

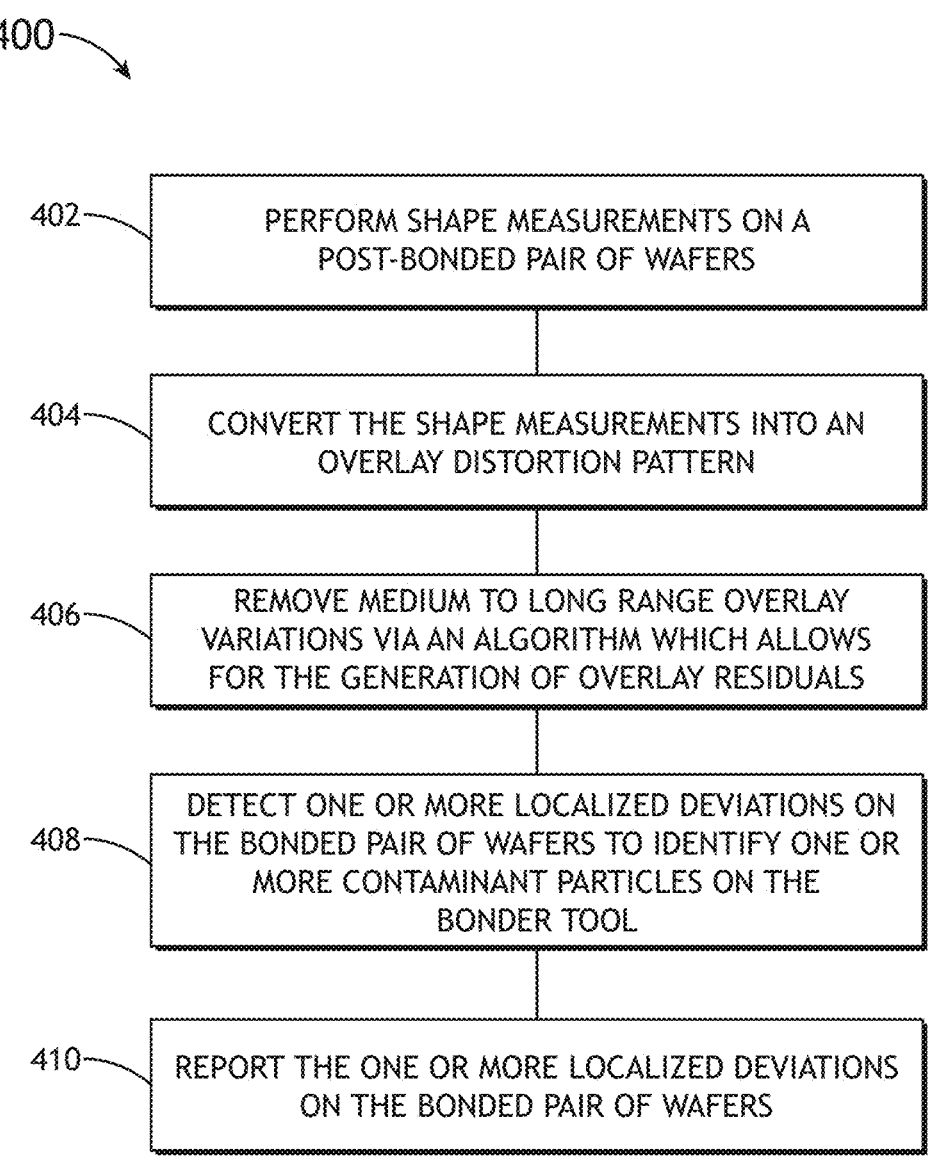

400

402 — PERFORM SHAPE MEASUREMENTS ON A POST-BONDED PAIR OF WAFERS

404 — CONVERT THE SHAPE MEASUREMENTS INTO AN OVERLAY DISTORTION PATTERN

406 — REMOVE MEDIUM TO LONG RANGE OVERLAY VARIATIONS VIA AN ALGORITHM WHICH ALLOWS FOR THE GENERATION OF OVERLAY RESIDUALS

408 — DETECT ONE OR MORE LOCALIZED DEVIATIONS ON THE BONDED PAIR OF WAFERS TO IDENTIFY ONE OR MORE CONTAMINANT PARTICLES ON THE BONDER TOOL

410 — REPORT THE ONE OR MORE LOCALIZED DEVIATIONS ON THE BONDED PAIR OF WAFERS

FIG.4

SYSTEM AND METHOD FOR DETECTING PARTICLE CONTAMINATION ON A BONDING TOOL

CROSS-REFERENCE TO RELATED APPLICATION

The present application claims the benefit under 35 U.S.C. § 119(e) of U.S. Provisional Application Ser. No. 63/226,642, filed Jul. 28, 2021, which is incorporated herein by reference in the entirety.

TECHNICAL FIELD

The present disclosure relates generally to semiconductor wafer shape metrology and, more particularly, to a system and method for detecting particle contamination on a bonding tool using wafer shape metrology.

BACKGROUND

Particle contamination on the chuck of a lithography scanner is a well-known issue in wafer manufacturing. The presence of particles on the chuck may cause imaging issues (due to out of focus imaging) as well as localized overlay issues. For this reason, scanners often use wafer leveling metrology in conjunction with algorithms to detect localized deviations based on thresholds. Particle contamination on bonders, similar to the case for scanners, introduces localized overlay distortions in bonded wafer pairs at the location of the particle, which are detrimental to the yield of the bonded chips. Metrology methods such as leveling, which would typically be used, in the case of lithography scanners, are not available on bonders. Therefore, it would be desirable to provide a system and method that allows for the detection of particle contamination on a bonding device.

SUMMARY

A wafer shape metrology system is disclosed, in accordance with one or more embodiments of the present disclosure. In one illustrative embodiment, the system is configured to perform one or more stress-free shape measurements on a bonded pair of wafers, where the bonded pair of wafers are bonded with a bonding tool. In another illustrative embodiment, the system includes a controller communicatively coupled to the wafer shape metrology sub-system. In another illustrative embodiment, the controller includes one or more processors configured to execute a set of program instructions stored in memory. In another illustrative embodiment, the set of program instructions are configured to cause the one or more processors to receive the one or more stress-free shape measurements of the bonded pair of wafers. In another illustrative embodiment, the one or more processors convert the one or more stress-free shape measurements of the bonded pair of wafers into an overlay distortion pattern. In another illustrative embodiment, the one or more processors detect one or more localized deviations on the bonded pair of wafers to identify one or more contaminant particles on the bonder tool. In another illustrative embodiment, the one or more processors report the one or more localized deviations on the bonded pair of wafers.

A system is disclosed, in accordance with one or more embodiments of the present disclosure. In one illustrative embodiment, the system includes a controller configured to receive shape measurements from a wafer shape metrology sub-system. In another illustrative embodiment, the controller includes one or more processors configured to execute a set of program instructions stored in a memory. In another illustrative embodiment, the set of program instructions are configured to cause the one or more processors to receive the one or more stress-free measurements of the bonded pair of wafers. In another illustrative embodiment, the one or more processors convert the one or more stress-free shape measurements of the bonded pair of wafers into an overlay distortion pattern. In another illustrative embodiment, the one or more processors detect one or more localized deviations on the bonded pair of wafers to identify one or more contaminant particles on the bonder tool. In another illustrative embodiment, the one or more processors report the one or more localized deviations on the bonded pair of wafers.

A method is disclosed, in accordance with one or more embodiments of the present disclosure. In one illustrative embodiment, the method may include, but is not limited to, acquiring one or more stress-free shape measurements for a bonded pair of wafers. In another illustrative embodiment, the method may include, but is not limited to, converting the one or more stress-free shape measurements of the bonded pair of wafers into an overlay distortion pattern. In another illustrative embodiment, the method may include, but is not limited to, detecting one or more localized deviations on the bonded pair of wafers to identify one or more contaminant particles on the bonder tool. In another illustrative embodiment, the method may include, but is not limited to, reporting the one or more localized deviations on the bonded pair of wafers.

It is to be understood that both the foregoing general description and the following detailed description are exemplary and explanatory only and are not necessarily restrictive of the invention as claimed. The accompanying drawings, which are incorporated in and constitute a part of the specification, illustrative embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 4 illustrates a flow diagram depicting a method of detecting localized distortions on a post-bonded wafer pair, in accordance with one or more embodiments of the present disclosure.

DETAILED DESCRIPTION

Figure 1:
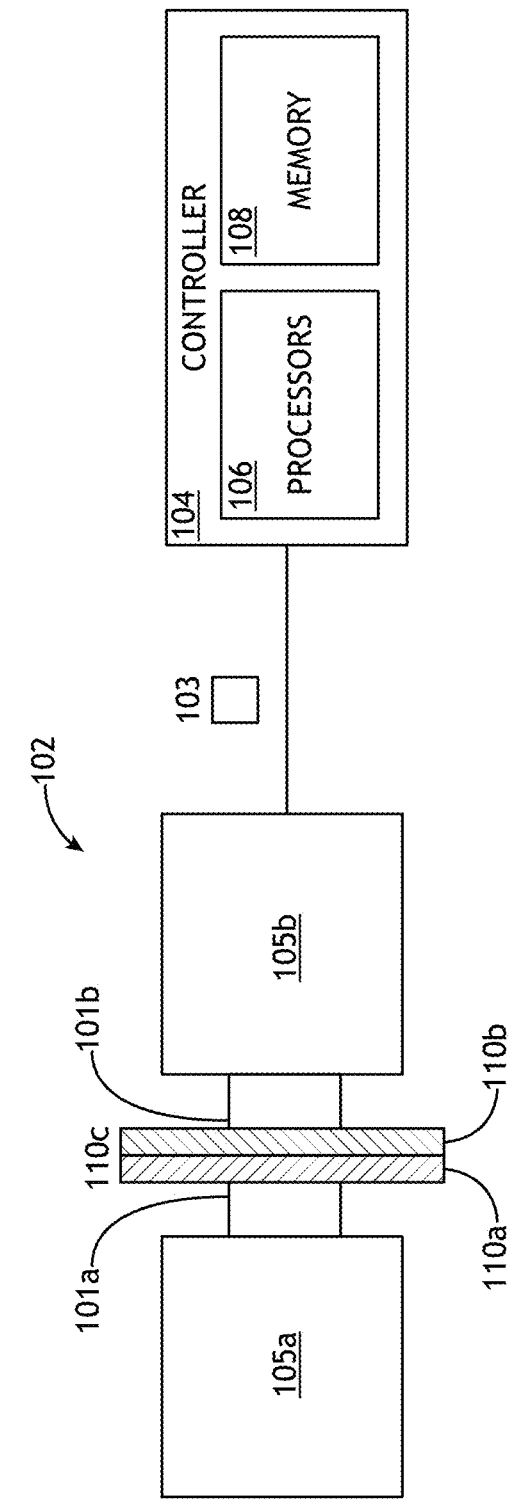
FIG. 1 illustrates a simplified block diagram of a wafer shape metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1-4, a system and method for detecting particle contamination are illustrated, in accordance with one or more embodiments of the present disclosure.

Embodiments of the present disclosure are directed to the detection of mechanical deformations in a bonded wafer caused by particle contamination on the bonding device. Embodiments of the present disclosure may utilize shape measurements performed on a post-bonding wafer pair. Embodiments of the present disclosure may convert the shape data collected from the post-bonding wafer pair into an overlay distortion pattern. The conversion of shape data to a distortion pattern may be carried out by a machine learning algorithm and/or a mechanical model. Embodiments of the present disclosure may detect localized deviations on a post-bonding wafer pair and report the localized deviations to a user.

Mechanical deformations may arise from contaminant particles appearing on the lower chuck of a bonder, or bonding tool. The contaminant particle on the lower chuck may cause the lower wafer to conform to the particle during the bonding process. The upper wafer may also conform to the contaminant particle creating a localized distortion, and as a result, a permanent distortion may be present in the bonded wafer that persists even after the wafer has been removed from the bonder. Typically, chuck contaminations are identified through hotspots detected on a number of wafers in the same location. If deemed too detrimental, the bonder may be shut down and a chuck cleaning procedure may be initiated to remove the particle contamination.

Embodiments of the present disclosure may be implemented to achieve tight overlay requirements on two wafers after a wafer-to-wafer bonding process (e.g., hybrid or fusion bonding). For example, embodiments of the present disclosure may be utilized to detect overlay distortions in the wafer-to-wafer bonding processes involved in the following: fabrication of image sensors (e.g., backlit image sensor technology); 3D NAND technologies where a device wafer and a memory wafer are bonded together; and backside power rail processes in logic device where a device wafer is bonded to a carrier wafer. In all these examples, tight overlay tolerance requirements are present. In image sensor and 3D NAND technologies, the overlay requirements are implemented to ensure a reliable connection between Cu-pads on one wafer to Cu-pads on the other wafer for a direct electrical connection. In the case of backside power rail technologies, it is desirable to achieve a low wafer distortion to ensure that the subsequent lithographic exposure of through silicon vias can achieve the required overlay tolerances given typical correction capabilities of the scanner (e.g., corrections per field (CPE) correction).

The process for detecting localized distortions 302 on post-bonding wafers may include, but is not limited to, the following: i) performing a wafer shape metrology step on the post-bonding wafer pair; ii) converting the shape data to a distortion pattern via an algorithm (e.g., machine learning algorithm or mechanical model); and iii) detecting localized distortions 302 via a threshold algorithm.

FIG. 1 illustrates a simplified block diagram of a wafer shape metrology system 100 for post-bonding overlay metrology, in accordance with one or more embodiments of the present disclosure.

In embodiments, the system 100 includes a wafer shape metrology sub-system 102. The wafer shape metrology sub-system 102 may include any wafer geometry tool or system, known in the art, capable of acquiring one or more shape parameters from a post-bonding pair of wafers 110c. It is to be understood that the term "post-bonding wafer pair" 110c should also be interpreted to include "post-bonded wafer pair", "bonded wafer pair", "bonded wafers", and the like.

In embodiments, the wafer shape metrology sub-system 102 may include an interferometer sub-system configured to perform one or more metrology and/or characterization processes on the post-bonding pair of wafers 110c. By way of another example, the wafer shape metrology sub-system 102 may include a dual interferometer system (e.g., dual Fizeau interferometer) configured to perform measurements on opposite sides of a post-bonded wafer pair 110c. For instance, wafer shape metrology sub-system 102 may include a first interferometer sub-system 105a configured to generate a first illumination beam 101a in order to perform one or more measurements on a surface of the first wafer 110a, and a second interferometer sub-system 105b configured to generate a second illumination beam 101b in order to perform one or more measurements on a surface of a second wafer 110b opposite the first wafer 110a. The wafer metrology sub-system 102 may include a Patterned Wafer Geometry (PWG) tool such as the PWG tool produced by KLA INC. The use of interferometry for wafer characterization is generally describe in U.S. Pat. No. 6,847,458, filed on Mar. 20, 2003; U.S. Pat. No. 8,949,057, filed on Oct. 27, 2011; and U.S. Pat. No. 9,121,684, filed on Jan. 15, 2013, which are incorporated herein by reference in their entirety.

It is noted that dual-sided interferometry, such as a PWG tool, may be of particular usefulness for implementation in the context of the present disclosure. For example, the PWG tool may collect information relating to thickness and/or change in thickness which may be input into a machine learning algorithm and/or a mechanical model of the present disclosure. Further, the PWG tool may include high resolution and full map capabilities, which are advantageous due to the typical small size (e.g., 1 millimeter or less) of the distortions caused by contaminant particles. Additionally, dual-sided measurements provide flexibility in the event one surface has attributes that makes measurement unreliable. Furthermore, dual-sided measurements allow for the averaging of shape information from two measurements, improving reliability.

It is noted herein that the scope of the present disclosure is not limited to a dual interferometer system of a PWG implementation and may be extended to encompass any wafer metrology system of tool known in the art including, but not limited to, single-sided interferometer systems.

In embodiments, the system 100 may include a controller 104 communicatively coupled to a detector output of the wafer shape metrology sub-system 102. The controller 104 may be configured to execute a set of program instructions stored in memory 108. The set of program instructions may be configured to cause the one or more processors 106 to carry out various steps and processes of the present disclosure.

In embodiments, the wafer shape metrology sub-system 102 may be configured to perform wafer shape measurements on a post-bonded pair of wafers 110c while in a stress-free or near stress-free state. For the purposes of the present disclosure, the term "stress-free" should be interpreted to mean a configuration with little force applied to the wafer from external sources. The term "stress-free" may alternatively be interpreted as "free standing". With external stresses removed, remnant deviations from a flat wafer shape are typically induced through stressed layers present on the frontside of the wafer or due to stresses imposed by the bonding process. It is noted that these stresses caused by layers present on the wafers are interpreted as internal stresses. In this sense, 'shape' of wafer is a combination of 'natural shape' (i.e., bare wafer shape) and the shape caused by internal stresses on either surface of the wafer such as thin-films.

In embodiments, the first wafer 110a and the second wafer 110b may undergo a bonding process via a bonder (not shown) to form a post-bonding wafer pair 110c. The wafer metrology sub-system 102 may perform a shape measurement on the post-bonding wafer pair 110c and then transmit the shape measurement data to the controller 104 via a data signal 103.

In embodiments, following the bonding process, the controller 104 converts the measured shape information for the post-bonding wafer pair 110c to local shape parameters that characterize local shape characteristics. For example, these parameters may include partial first and second derivatives of the shape of predictions of in-plane displacement using different mechanical models. For instance, the local shape parameters may include, but are not limited to, localized shape curvature (LSC) and/or in-plane distortion (IPD).

It is noted that additional or alternative embodiments of determining post bonding overlay distortion patterns are described in detail in U.S. patent application Ser. No. 17/161,369, filed on Jan. 28, 2021, which is incorporated herein by reference in the entirety.

In embodiments, a first algorithm executed by the controller 104 includes a machine learning algorithm. The machine learning algorithm applied by controller 104 may include any machine learning algorithm known in the art including, but not limited to, a deep learning algorithm. For example, the deep learning algorithm may include, but is not limited to, a neural network (e.g., convolutional neural network (CNN), generative adversarial network (GAN), recurrent neural network (RNN), etc.). In this embodiment, the controller 104 extracts multiple parameters from the wafer shape data of the post-bonding wafer pair 110c. For example, the controller 104 may generate IPD, Gen4 (which includes a shape-to-overlay conversion algorithm), and the like for the post-bonding wafer pair 110c on a local basis. Then, the controller 104 may use any of these generated parameters as inputs into the machine learning algorithm. For example, in the case of a neural network, the controller 104 may generate IPD, Gen4, and the like for the post-bonding wafer pair 110 on a local basis and then input these metrics into the neural network.

The one or more processors 106 of controller 104 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 106 may include any device configured to execute algorithms and/or instructions (e.g., program instructions stored in memory).

In embodiments, the one or more processors 106 may be embodied as a desktop computer, mainframe computer system, workstation, image computer, parallel processor, networked computer, or any other computer system configured to execute a program configured to operate or operate in conjunction with the metrology system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 104 may include one or more controllers housed in a common housing or within multiple housings. In this way, any controller or combination of controllers may be separately packaged as a module suitable for integration into metrology system 100. Further, the controller 104 may analyze data received from the wafer metrology sub-system 102 and feed the data to additional components within the metrology system 100 or external to the metrology system 100.

The memory medium 108 may include any storage medium known in the art suitable for storing program instructions executable by the associated one or more processors 106. For example, the memory medium 108 may include a non-transitory memory medium. By way of another example, the memory medium 108 may include, but is not limited to, a read-only memory (ROM), a random-access memory (RAM), a magnetic or optical memory device (e.g., disk), a magnetic tape, a solid-state drive and the like. It is further noted that memory medium 108 may be housed in a common controller housing with the one or more processors 106. In one embodiment, the memory medium 108 may be located remotely with respect to the physical location of the one or more processors 106 and controller 104. For instance, the one or more processors 106 of controller 104 may access a remote memory (e.g., server), accessible through a network (e.g., internet, intranet and the like).

It is noted herein that the one or more components of the disclosed system 100 may be communicatively coupled to the various other components of the system in any manner known in the art. For example, the wafer metrology sub-system 102, controller 104, and a user interface may be communicatively coupled to each other and other components via a wireline (e.g., copper wire, fiber optic cable, and the like) or wireless connection (e.g., RF coupling, IR coupling, data network communication (e.g., WiFi, WiMax, 3G, 4G, 4G LTE, 5G, Bluetooth, and the like)).

Figure 2:
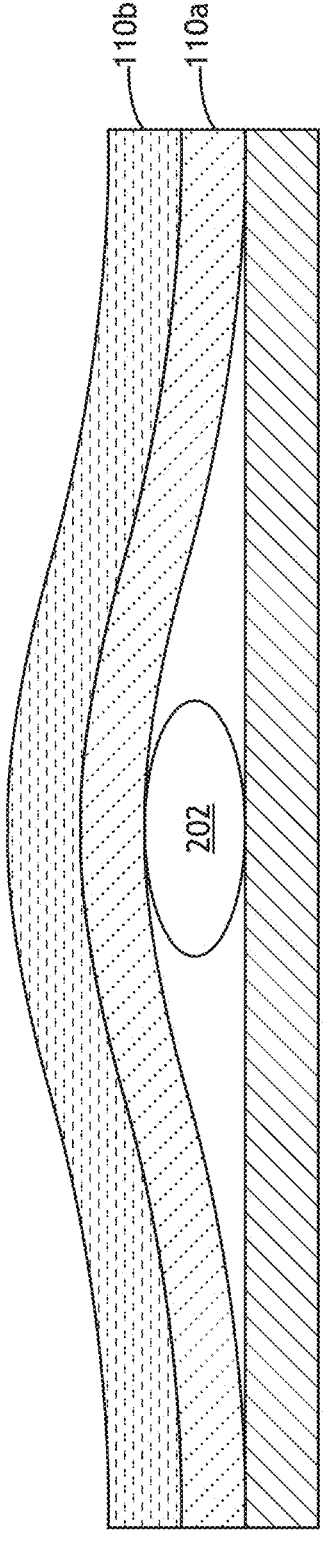
FIG. 2 illustrates a perspective view of a bonder tool, wherein the bonder tool includes a contaminant particle, in accordance with one or more embodiments of the present disclosure.

FIG. 2 illustrates a perspective view of a contaminant particle 202 located on a bonder chuck, in accordance with one or more embodiments of the present disclosure. For example, this particle may have been present on the backside of wafer 110a. By way of another example, this particle may have been originated from the use of a prior wafer and become fixed to the bonder chuck. The presence of the contaminant particle 202 may induce detrimental effects to the performance of the bonded device as discussed below. The contaminant particle 202 may cause one or more localized distortions 302 to appear in a post-bonding wafer pair 110c (shown in FIG. 1). For example, the contaminant particle 202 may cause the first wafer 110a to conform to the shape of the contaminant particle 202. By way of another example, during the bonding process, the second wafer 110b may also conform to the shape of the contaminant particle 202 resulting in a permanent distortion on the post-bonded wafer pair 110c. By way of another example, the significant distortion of the wafers 110a,b may cause wafer 110b to fail to bond to wafer 110a altogether, thus, creating a void. In either case localized distortion patterns will persist even after the post-bonded wafer pair 110c has been removed from the bonder. As a result, significant shape changes of the bonded pair can be detected using a shape metrology tool. It is to be understood that the term one or more "localized distortions" 302 should also be interpreted to include "localized deformations", "localized deviations", and the like.

Figure 3:
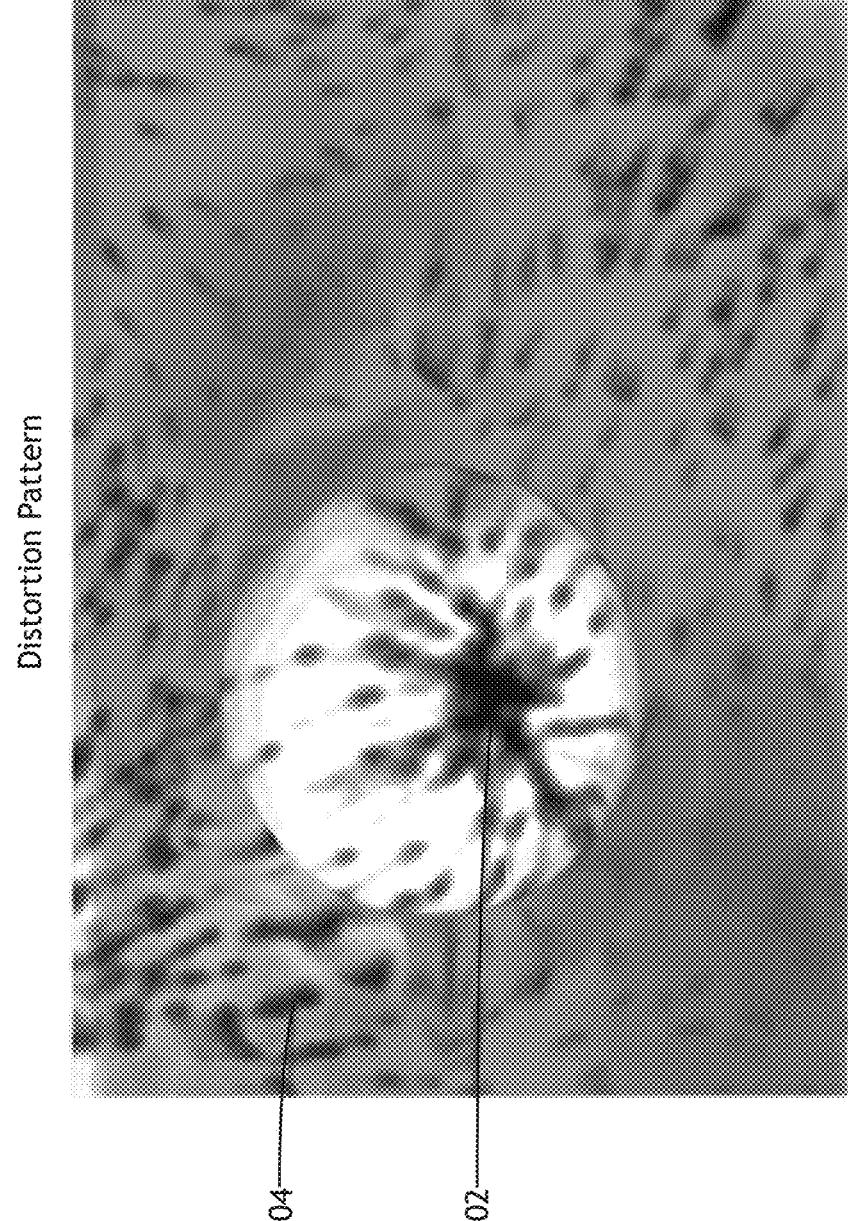
FIG. 3 illustrates an overlay distortion pattern of a localized distortion introduced by the contaminant particle of FIG. 2, in accordance with one or more embodiments of the present disclosure.

FIG. 3 illustrates an overlay distortion pattern 300 of a localized distortion 302 introduced by the contaminant particle 202 of FIG. 2, in accordance with one or more embodiments of the present disclosure. In embodiments, one or more overlay distortion patterns 300 for the bonded pair of wafers 110c may be generated by the controller 104 based on the one or more stress-free shape measurements performed on the post-bonded wafer pair 110c.

In embodiments, the one or more stress-free shape measurements may be converted into one or more overlay distortion patterns 300 for the bonded pair of wafers 110c through the use of a conversion algorithm (e.g., IPD). As seen in FIG. 3, a display may be generated which is represented by a heat map displaying the one or more overlay distortion patterns 300 for the bonded pair of wafers 110c as well as the length of the one or more overlay distortion patterns 300. For example, the one or more overlay distortion patterns 300 for the bonded pair of wafers 110c may be represented by a generated vector distribution 304.

In additional and/or alternative embodiments, the localized distortions 302 may be modeled with a long-range model (e.g., a W3F3 type model) in order to detect the localized distortion 302 hotspots across the whole post-bonded wafer pair 110c. For example, the long-range model may be configured to generate a model vector distribution to use as a reference in comparison to the actual generated vector distribution 304. More specifically a full wafer vector map of the localized distortions 302 may be generated. The observed vector map may be described with a long-range model quite commonly used for describing vector maps of overlay distortions in lithography. One such model is a W3F3 model which uses global wafer positions X and Y as well as within field coordinates x, y to describe the overlay distribution. The indices indicate the polynomial order of the model (in this case $3^{rd}$ order, but other orders, typically between $1^{st}$ up to $5^{th}$ order are in use). The use of higher-order polynomials typically enhances the sensitivity of the algorithm to localized distortions. The benefits of this approach include an easier detection of localized distortions 302 caused by contaminations relative to other mechanisms causing distortion variation. This then enhances the ability to identify the localized distortions 302. By way of another example, a change in value between the model vector distribution and the actual generated vector distribution 304 may be calculated. The calculated change in value may be used in conjunction with a threshold algorithm to detect localized distortions 302 operating on the length of the vectors. Different metrics derived from the wafer map may be used to identify the locations of the localized distortions 302. For example, the length of the vectors may be used and locations identified as fail locations. By way of another example, the signature of the vector map itself may be used as it is typically forms a local "starburst pattern". It is noted herein that the high resolution and full map capabilities of the PWG tool are advantageous in this case since the size of these distortions are typically less than or equal to one millimeter.

FIG. 4 illustrates a method of detecting localized distortions 302 between features on a post-bonded wafer pair, in accordance with one or more embodiments of the present disclosure. It is noted herein that the steps of method 400 may be implemented all or in part by wafer metrology system 100. It is further recognized, however, that the method 400 is not limited to the wafer metrology system 100 in that additional or alternative system-level embodiments may carry out all or part of the steps of method 200.

In embodiments, the first wafer 110a and the second wafer 110b may be bonded together to form a post-bonded pair of wafers 110c. For example, a bonder (not depicted) may bond the first wafer 110a and the second wafer 110b in a wafer-to-wafer bonding process. The bonder may be configured for hybrid wafer bonding or fusion wafer bonding.

In a step 402, shape measurements are performed on the post bonded pair of wafers 110c following the bonding process. For example, as shown in FIG. 1, the wafer shape sub-system 102 may be utilized to perform the wafer shape measurement on the post-bonded pair of wafers 110c.

In a step 404, one or more overlay distortion patterns for the bonded pair of wafers 110c are generated based on the shape measurements performed on the post-bonded pair of wafers 110c. For example, the controller 104 may execute an algorithm that converts shape information from the post-bonded pair of wafers 110c to one or more overlay distortion pattern of the post-bonded pair of wafers 110c.

In embodiments, the measured shape information of step 402 may be converted by controller 104 to local shape parameters that characterize local shape characteristics. Examples of such parameters are localized shape curvature, IPD, and any other shape metrics used in the art to detect wafer distortions.

In a step 406, medium-to-long range overlay variations are removed via an algorithm. More specifically, a full wafer map of the distortion pattern standard overlay models such as those used for lithography modeling may be used. For example, a W3F3 model may be used, which uses global wafer positions X and Y as well as within field coordinates x, y to describe the overlay distribution. The indices indicate the polynomial order of the model. In this particular case, the model describes both the x and y vector components of the distortion map as a polynomial up to the third order in both the wafer and field locations. This approach may allow for easier detection of the fairly localized distortions 302 caused by the contaminant particle 202 relative to other mechanisms causing distortion variation. This then enhances the ability to identify localized distortions 302. For example, the removal of the medium to long range overlay variations may allow for the generation of overlay residuals.

In a step 408, one or more localized deviations 302 in the one or more overlay distortion patterns 300 are detected for the post-bonded pair of wafers 110c based on the overlay distortion pattern. For example, detecting one or more localized deviations 302 in the one or more overlay distortion patterns 300 for the bonded pair of wafers 110c may allow for the identification of one or more contaminant particles 202 on the bonder tool.

In embodiments, a location of the one or more contaminant particles 202 on the bonder tool is identified. In this regard, the detected one or more localized deviations 302 in the one or more overlay distortion patterns 300 for the bonded pair of wafers 110c may be used to determine the location of the one or more contaminant particles 202 on the bonder tool. In embodiments, the localized distortions 302 caused by a contaminant particle 202 on the bonder chuck may be identified based on a reappearance of the contaminant particle 202 in the same physical location of the bonded pair of wafers 110*c*. For example, every new wafer may use an algorithm to retrieve the defect maps from prior wafers bonded on a chuck and search for the defect locations that have been identified (within a specified tolerance radius) of previous wafers in the same location. For example, if a defect occurs on 3 sequential bonded wafers 110*c*, then the bonder may be flagged for requiring a corrective action (e.g., chuck cleaning process). Knowing the location of the particle on the bonder, which can be directly converted to a physical location on the chuck given the orientation in which the wafers were bonded, may allow for a focused effort of cleaning a particular location on the bonder chuck. For example, the controller 104 may be configured to correlate the position of the one or more localized deviations 302 in the one or more overlay distortion patterns 300 to a position of the one or more contaminant particles 202 on the bonder tool.

In a step 410, one or more localized deviations 302 on the bonded pair of wafers 110*c* may be reported. For example, in the case where one or more localized deviations 302 exceed a selected threshold, the controller 104 may report an alert to a user interface. By way of another example, if one or more contaminant particles 202 on the bonder tool are identified, then the bonder tool may be configured to shut down (e.g., a controller instructing the bonder tool to automatically shut down, a user shutting down the bonder tool, or the like) and a cleaning procedure may be initiated to remove the contaminant particle 202.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," "temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A wafer shape metrology system comprising:
a wafer shape metrology sub-system configured to perform one or more stress-free shape measurements on a bonded pair of wafers, wherein the bonded pair of wafers are bonded with a bonding tool; and
a controller communicatively coupled to the wafer shape metrology sub-system, the controller including one or more processors configured to execute a set of program instructions stored in a memory, the set of program instructions configured to cause the one or more processors to:

receive the one or more stress-free shape measurements of the bonded pair of wafers;
convert the one or more stress-free shape measurements of the bonded pair of wafers into one or more overlay distortion patterns for the bonded pair of wafers, wherein the one or more stress-free shape measurements are input into a machine learning algorithm to convert the one or more stress-free shape measurements into the one or more overlay distortion patterns;
detect one or more localized deviations in the bonded pair of wafers to identify one or more contaminant particles on the bonding tool; and
report the one or more localized deviations in the bonded pair of wafers.

2. The system of claim 1, wherein the one or more stress-free shape measurements are performed on the bonded pair of wafers using interferometric techniques.

3. The system of claim 1, wherein the one or more overlay distortion patterns includes variations exceeding 5 mm in length.

4. The system of claim 1, wherein the one or more stress-free shape measurements comprise at least one of local shape curvature (LSC) or in-plane distortion (IPD).

5. The system of claim 1, wherein the overlay distortion pattern is represented by at least one of a heat map or a generated vector distribution.

6. The system of claim 5, wherein a residual vector distribution is calculated by taking the delta between a model vector distribution and the generated vector distribution.

7. The system of claim 6, wherein the detecting one or more localized deviations in the bonded pair of wafers comprises a threshold algorithm, wherein the threshold algorithm operates on a length of the residual vector.

8. The system of claim 7, wherein the one or more localized deviations are reported when the length of the residual vector exceeds a threshold value.

9. The system of claim 1, wherein the one or more processors are further configured to determine a position of the one or more localized deviations, wherein the position of the one or more localized deviations are used to determine a position of the contaminant particle on the bonding tool via a position correlating algorithm.

10. A system comprising:
a controller configured to receive one or more stress-free shape measurements from a wafer shape metrology sub-system, wherein the controller includes one or more processors configured to execute a set of program instructions stored in a non-transitory memory, wherein the set of program instructions are configured to cause the one or more processors to:
direct a wafer shape metrology sub-system to perform the one or more stress-free shape measurements;
receive the one or more stress-free shape measurements of a bonded pair of wafers;
convert the one or more stress-free shape measurements of the bonded pair of wafers into one or more overlay distortion patterns for the bonded pair of wafers, wherein the one or more stress-free shape measurements are input into a machine learning algorithm to convert the one or more stress-free shape measurements into the one or more overlay distortion patterns;
detect one or more localized deviations in the one or more overlay distortion patterns for the bonded pair of wafers to identify one or more contaminant particles on a bonding tool; and report the one or more localized deviations in the bonded pair of wafers and instruct the bonding tool to shutdown.

11. The system of claim 10, wherein the one or more stress-free shape measurements are performed on the bonded pair of wafers using interferometric techniques.

12. The system of claim 10, wherein a machine learning algorithm is used to remove medium-to-long range overlay variations generating overlay residuals.

13. The system of claim 10, wherein the one or more stress-free shape measurements comprise at least one of local shape curvature (LSC) or in-plane distortion (IPD).

14. The system of claim 10, wherein the overlay distortion pattern is represented by at least one of a heat map or a generated vector distribution.

15. The system of claim 14, wherein a residual vector distribution is calculated by taking the delta between a model vector distribution and the generated vector distribution.

16. The system of claim 15, wherein the detecting one or more localized deviations in the bonded pair of wafers comprises a threshold algorithm, wherein the threshold algorithm operates on a length of the residual vector.

17. The system of claim 16, wherein the one or more localized deviations are reported when the length of the residual vector exceeds a threshold value.

18. The system of claim 17, wherein the one or more processors are further configured to determine a position of the one or more localized deviations, wherein the position of the one or more localized deviations are used to determine a position of the contaminant particle on the bonding tool via a position correlating algorithm.

19. A method comprising:

directing a wafer shape metrology sub-system to perform one or more stress-free shape measurements;

receiving the one or more stress-free shape measurements for a bonded pair of wafers;

converting the one or more stress-free shape measurements of the bonded pair of wafers into one or more overlay distortion patterns for the bonded pair of wafers, wherein the one or more stress-free shape measurements are input into a machine learning algorithm to convert the one or more stress-free shape measurements into the one or more overlay distortion patterns;

detecting one or more localized deviations in the one or more overlay distortion patterns for the bonded pair of wafers to identify one or more contaminant particles on a bonding tool; and reporting the one or more localized deviations in the bonded pair of wafers and instructing the bonding tool to shutdown.

*     *     *     *     *